Figure 9:
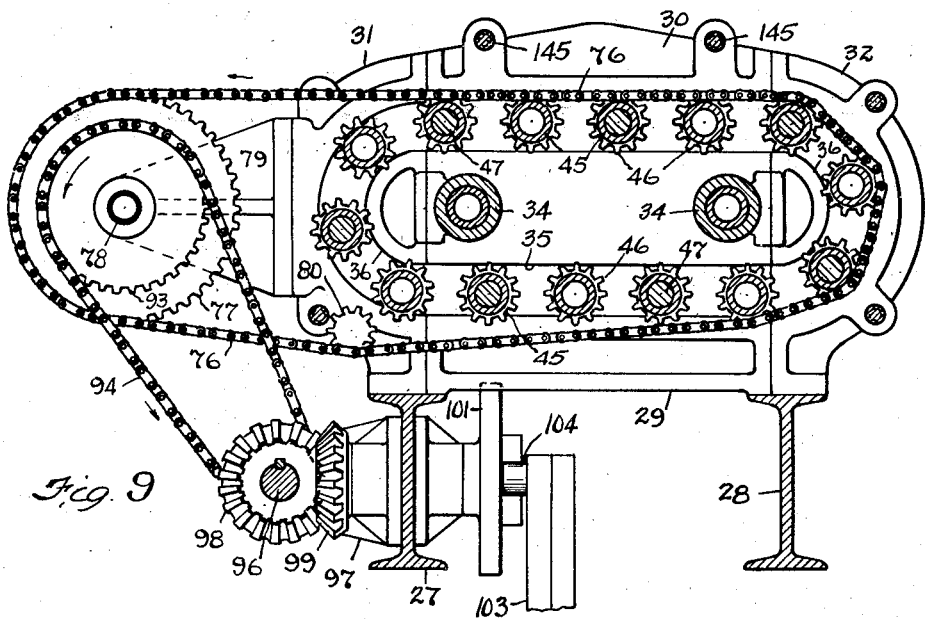

June 1, 1937. F. L. SCOUTTEN 2,081,959
APPARATUS FOR MAKING ROLL FORGED ARTICLES
Filed Jan. 19, 1934 11 Sheets-Sheet 1
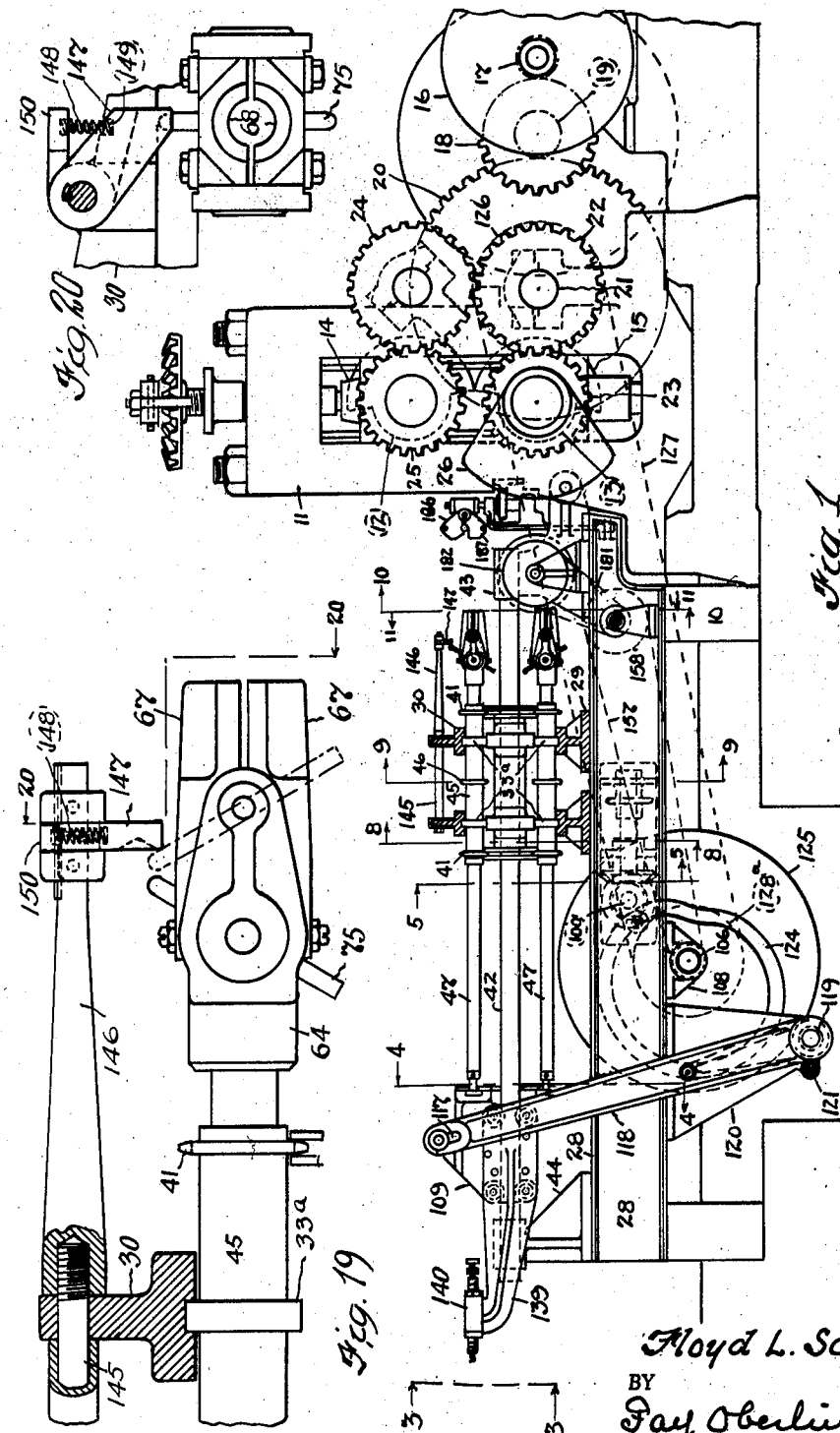
INVENTOR.
Floyd L. Scoutten
BY
Fay, Oberlin & Fay
ATTORNEYS

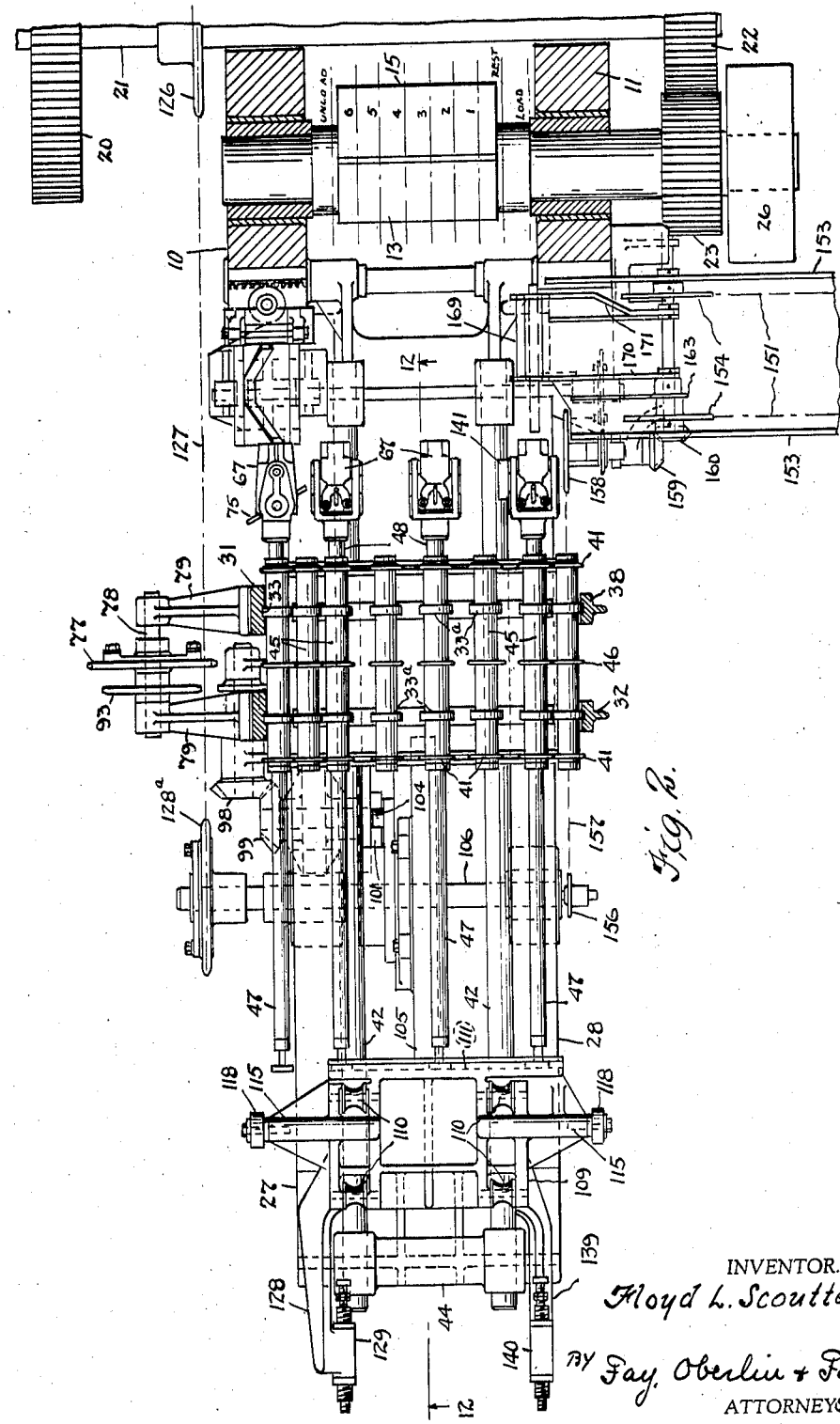

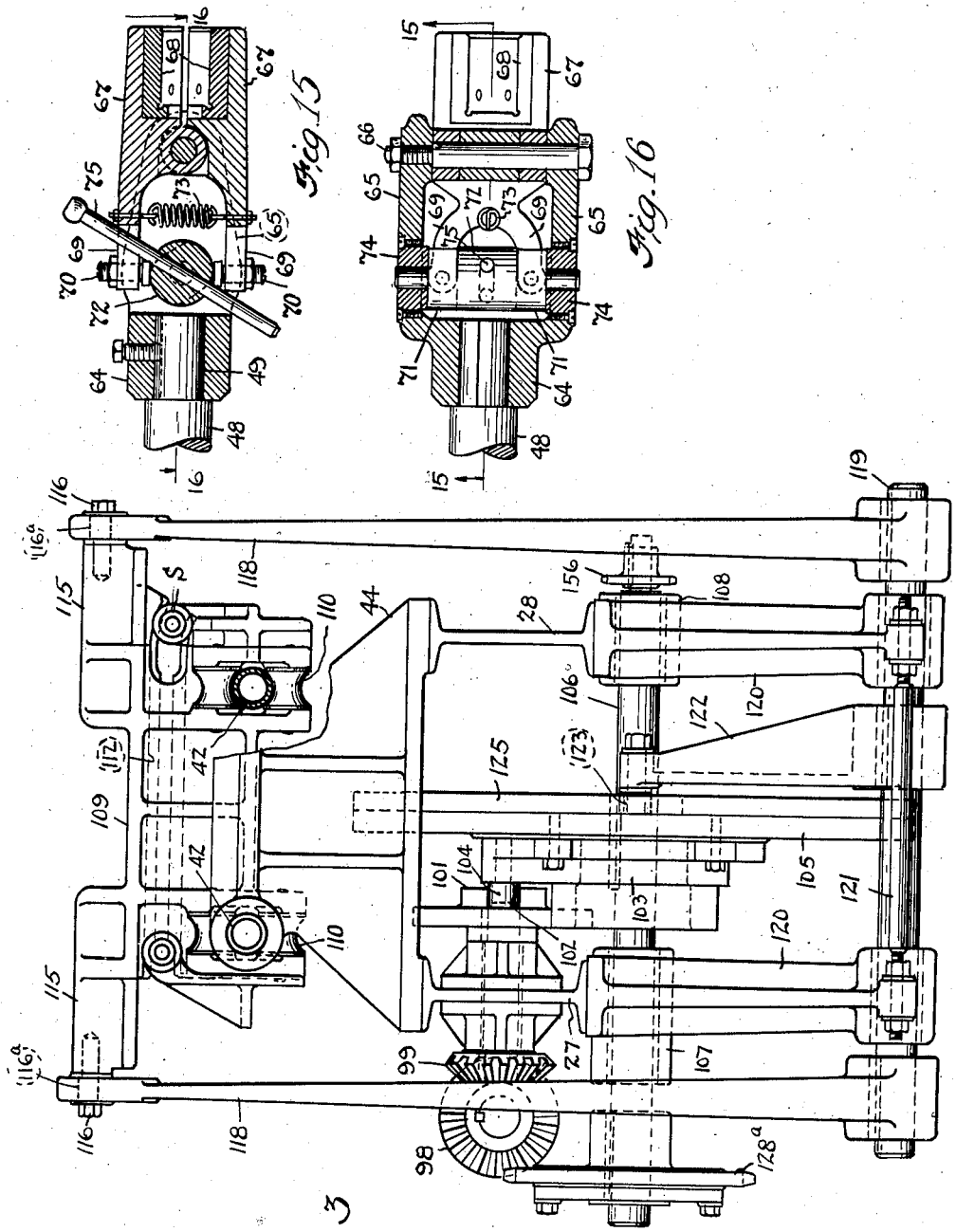

June 1, 1937.  F. L. SCOUTTEN  2,081,959
APPARATUS FOR MAKING ROLL FORGED ARTICLES
Filed Jan. 19, 1934  11 Sheets-Sheet 4

INVENTOR.
Floyd L. Scoutten
BY
Fay, Oberlin & Fay
ATTORNEYS

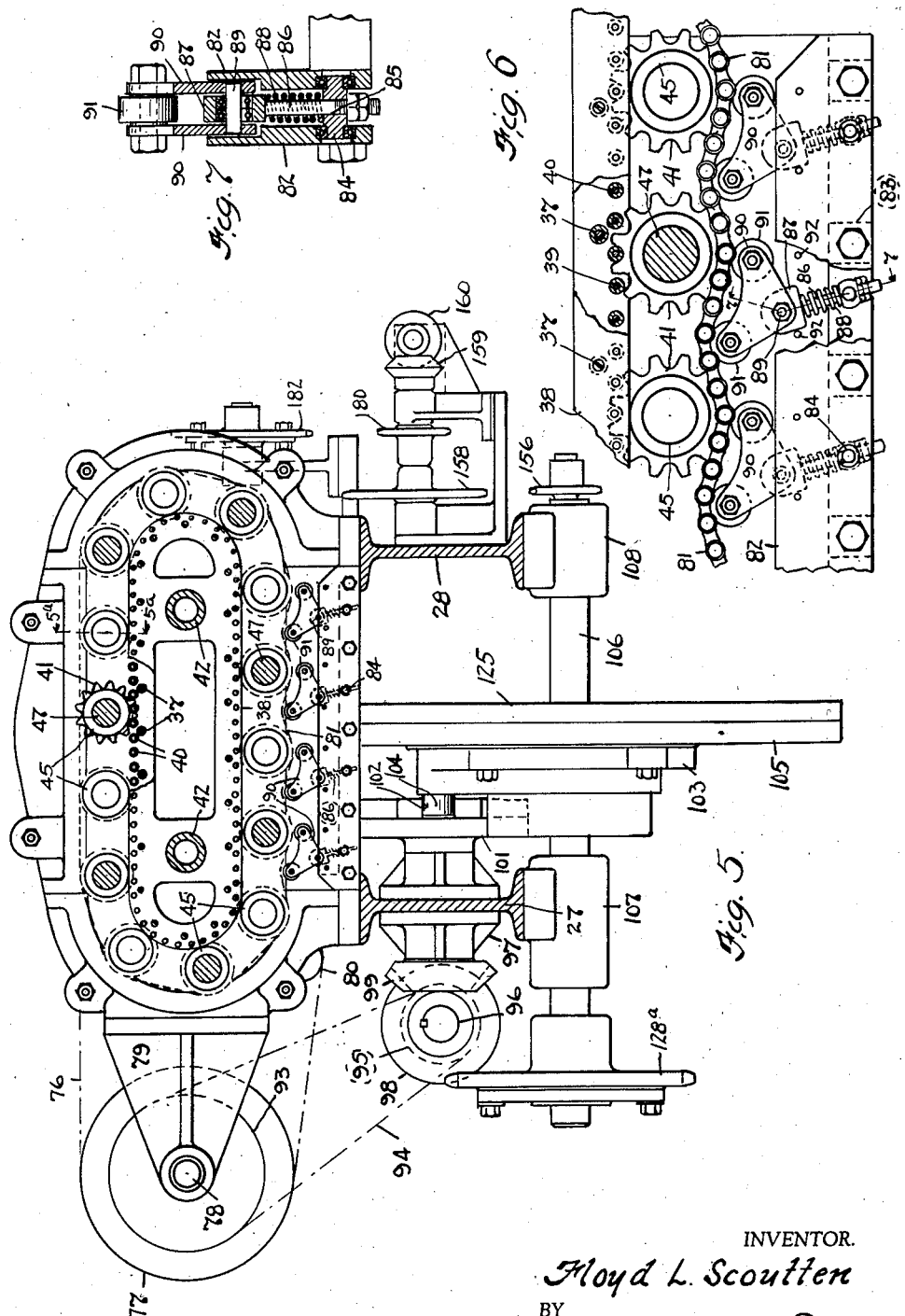

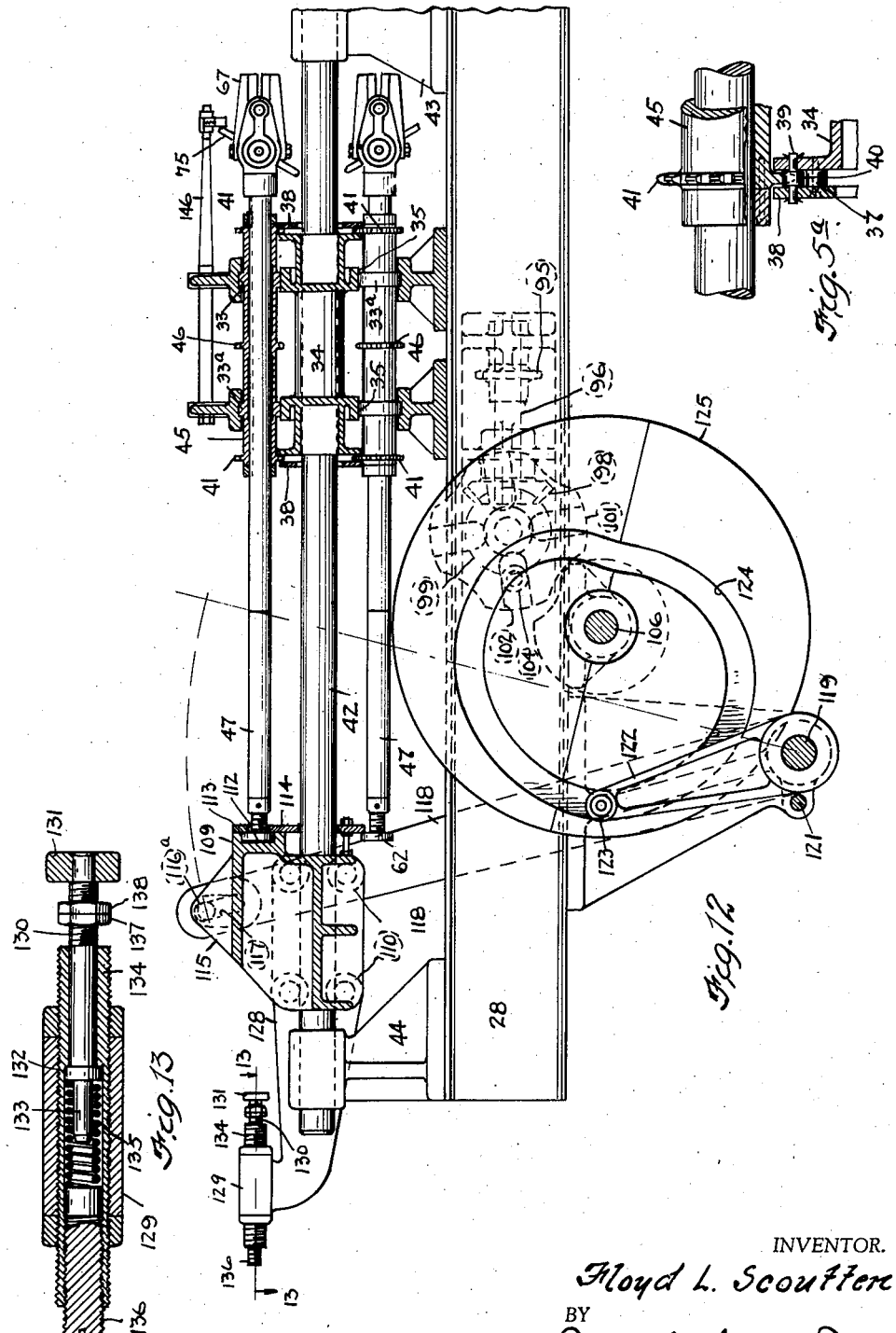

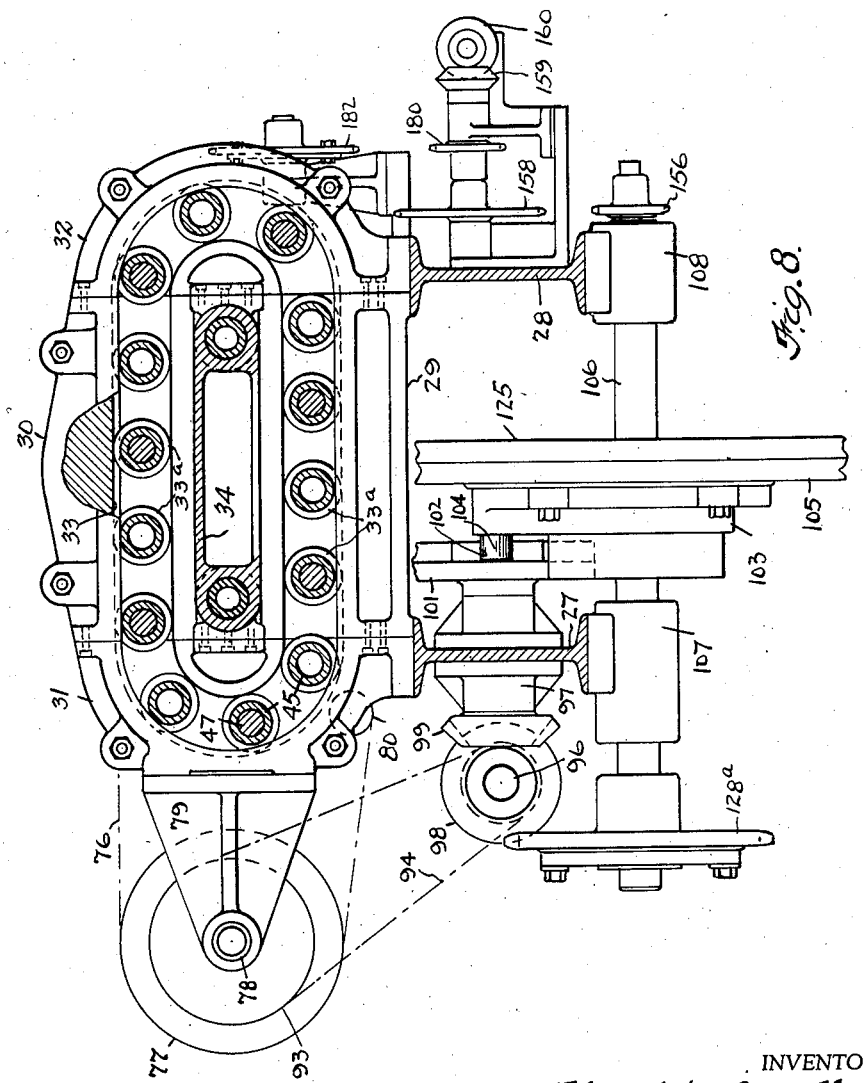

June 1, 1937.  F. L. SCOUTTEN  2,081,959
APPARATUS FOR MAKING ROLL FORGED ARTICLES
Filed Jan. 19, 1934   11 Sheets-Sheet 8
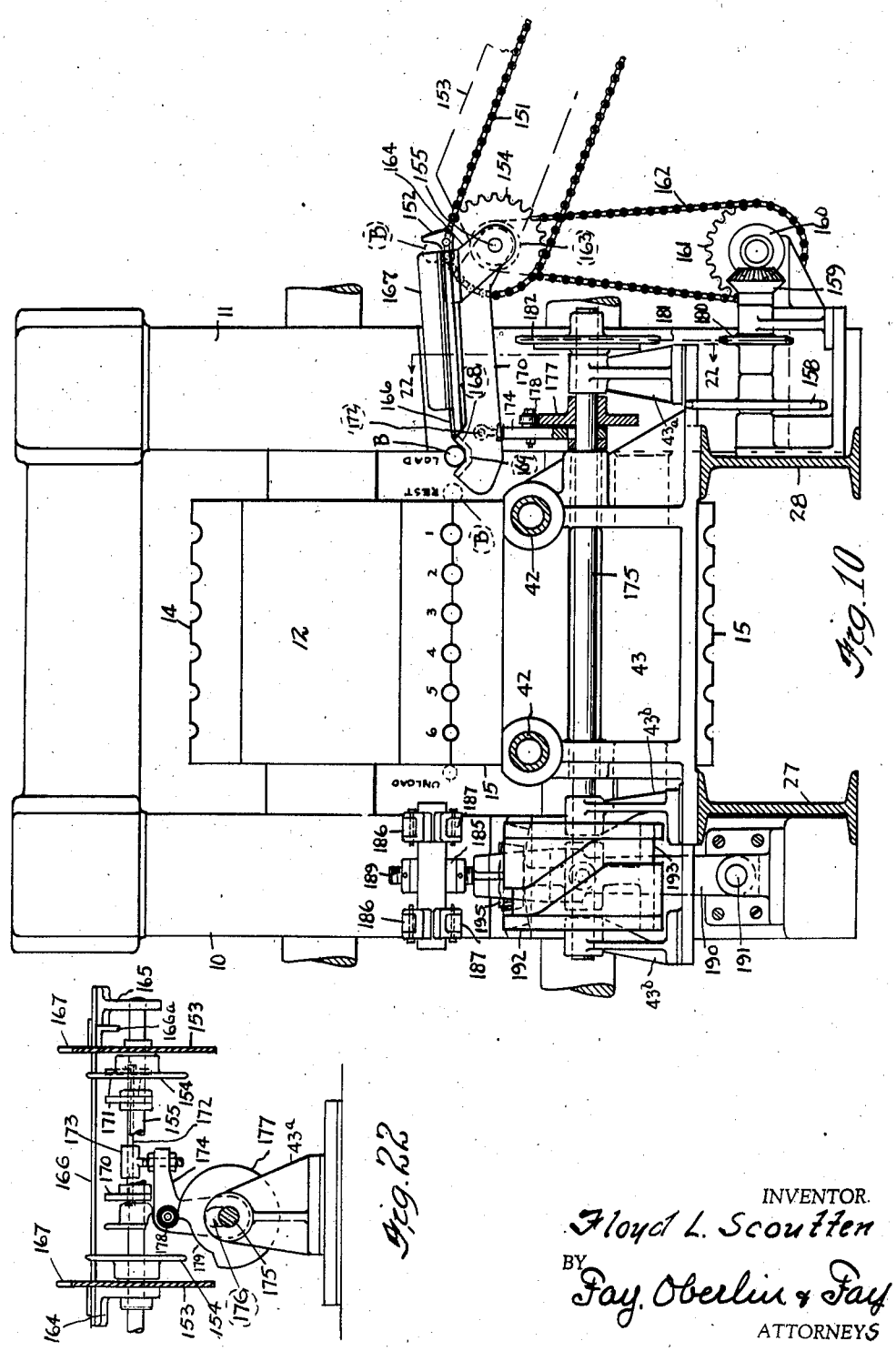
INVENTOR.
Floyd L. Scoutten
BY
Fay, Oberlin & Fay
ATTORNEYS June 1, 1937.  F. L. SCOUTTEN  2,081,959
APPARATUS FOR MAKING ROLL FORGED ARTICLES
Filed Jan. 19, 1934  11 Sheets-Sheet 9

INVENTOR.
Floyd L. Scoutten
BY
Fay, Oberlin & Fay
ATTORNEYS

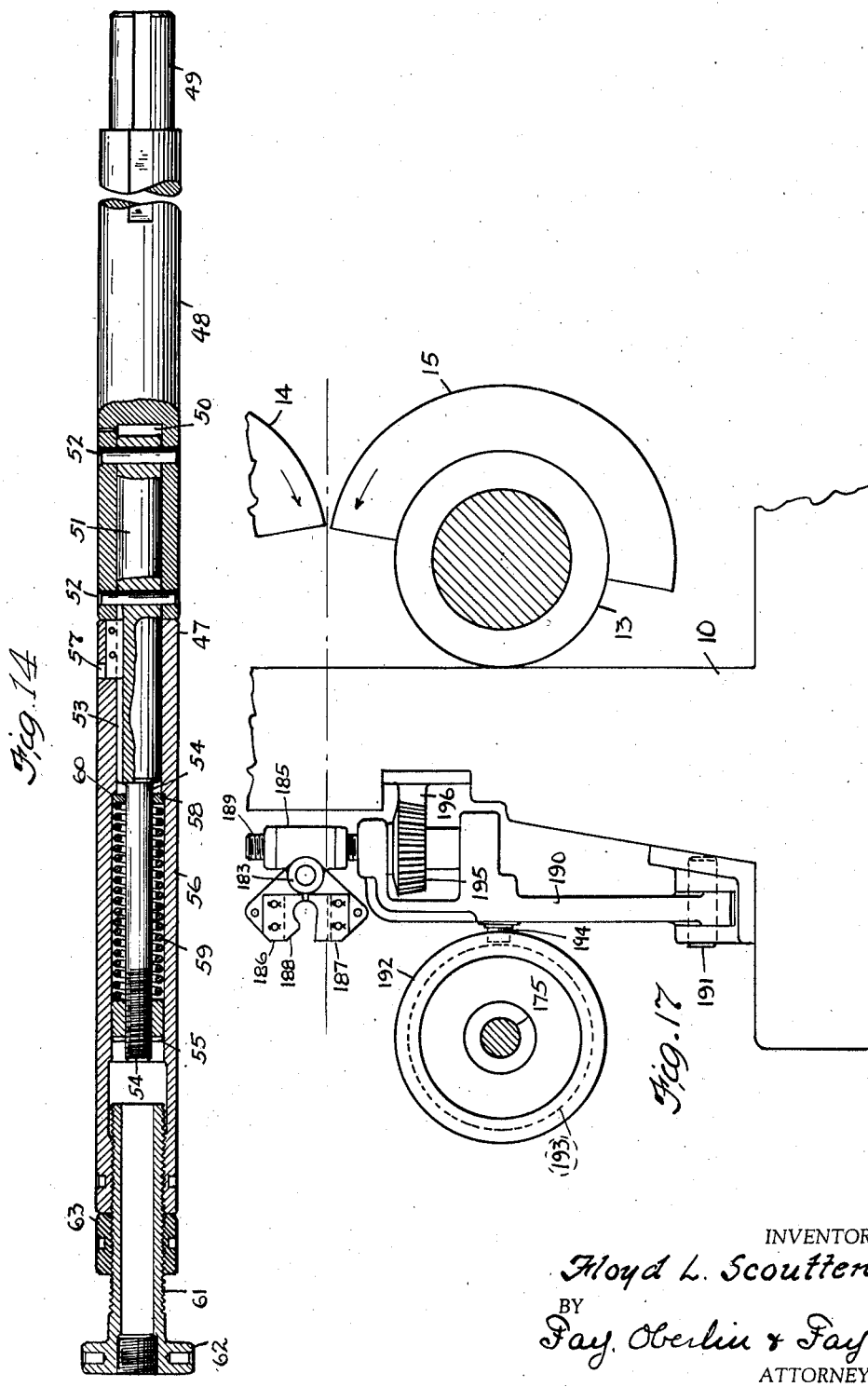

June 1, 1937.  F. L. SCOUTTEN  2,081,959
APPARATUS FOR MAKING ROLL FORGED ARTICLES
Filed Jan. 19, 1934  11 Sheets-Sheet 11
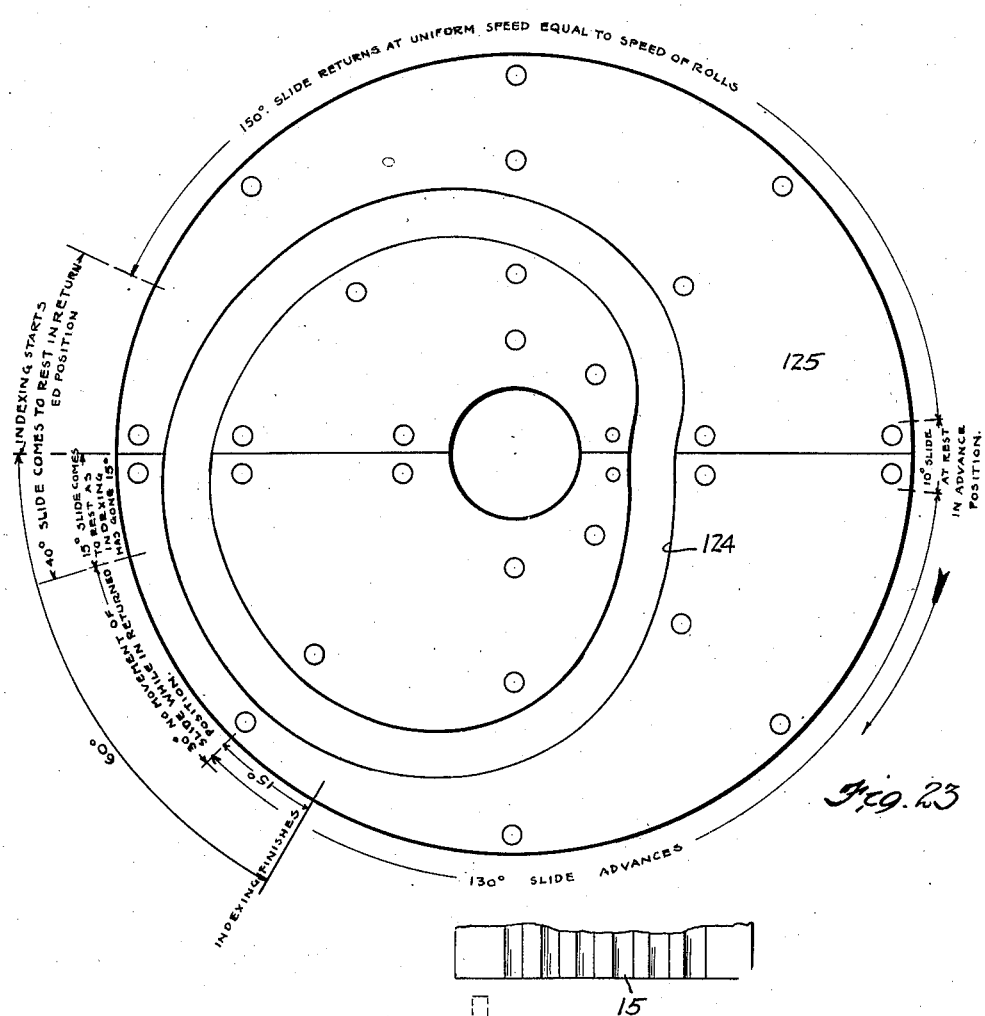
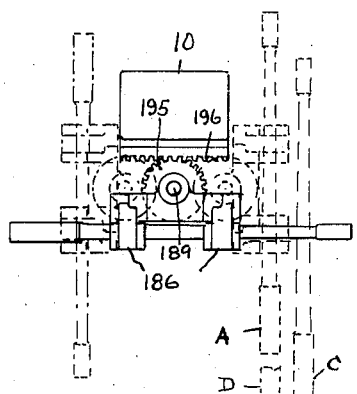
INVENTOR.
Floyd L. Scoutten
BY
Fay, Oberlin & Fay
ATTORNEYS Patented June 1, 1937

2,081,959

UNITED STATES PATENT OFFICE 2,081,959

APPARATUS FOR MAKING ROLL FORGED ARTICLES

Floyd L. Scoutten, Hudson, Ohio, assignor to Mid-West Forge Company, Cleveland, Ohio, a corporation of Ohio Application January 19, 1934, Serial No. 707,274

21 Claims. (Cl. 80—26)

This invention relates, as indicated, to apparatus for making roll-forged articles, but has reference more particularly to apparatus for automatically handling bar blanks during forging thereof in roll-forging mills and the like.

Primary objects of the invention are the elimination of the human or personal element in the manufacture of roll-forged articles, the production of such articles in a more uniform manner than is possible with manual control of the various operations, a considerable increase in the capacity of a mill of given size, and the avoidance of the necessity of reheating the bar blank or partly finished product at any stage in the various operations.

Another object of the invention is to provide apparatus of the character described which is adapted to receive bar blanks that have been previously heated to a forging temperature, feed the blanks to the successive passes of the roll-forging mill and rotate the blanks about their axes in the intervals between successive feeding movements.

Another object of the invention is to provide apparatus operating in synchronism with the blank feeding apparatus and adapted to deliver to the latter the heated bar blanks.

A further object of the invention is to provide apparatus operating in synchronism with the feeding and delivery apparatus and adapted to remove or unload the finished or roll-forged articles from the feeding apparatus.

A still further object of the invention is to provide driving mechanism whereby the roll-forging mill and all of the aforesaid apparatus which is associated therewith are driven in synchronism with each other.

To the accomplishment of the foregoing and related ends, said invention, then, consists of the means hereinafter fully described and particularly pointed out in the claims; the annexed drawings and the following description setting forth in detail one product and certain means for carrying out the invention, such disclosed article and means disclosing, however, but one of various ways in which the principle of the invention may be used.

In said annexed drawings:—

Figure 4:
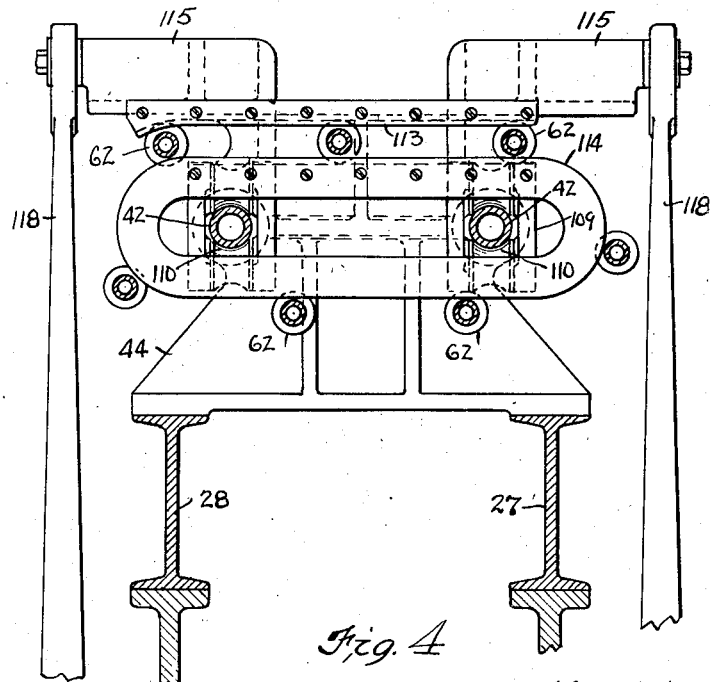
Figure 11:
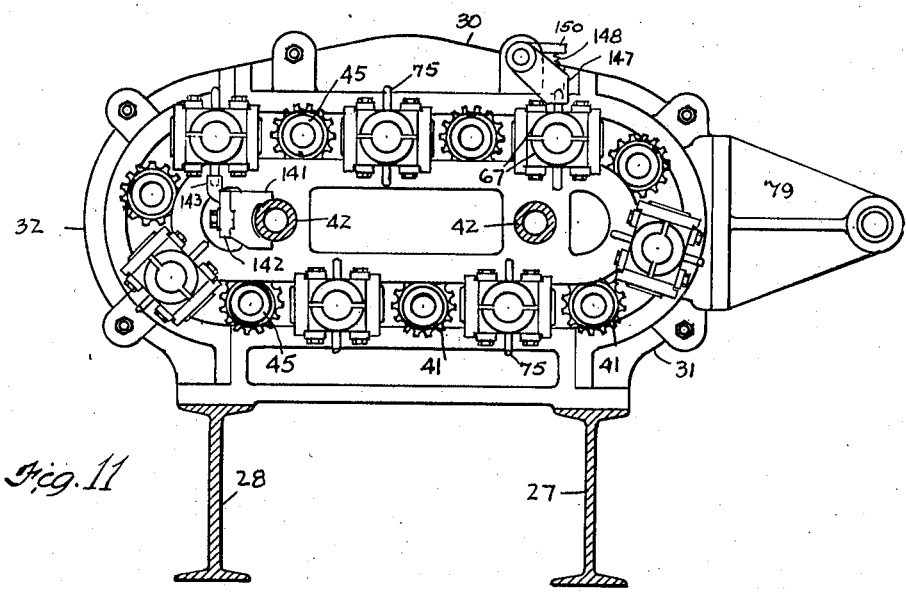
Figure 21:
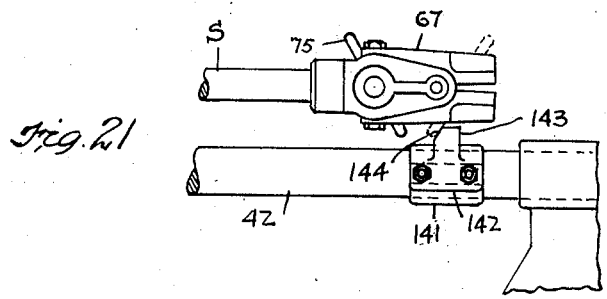
Figure 24:
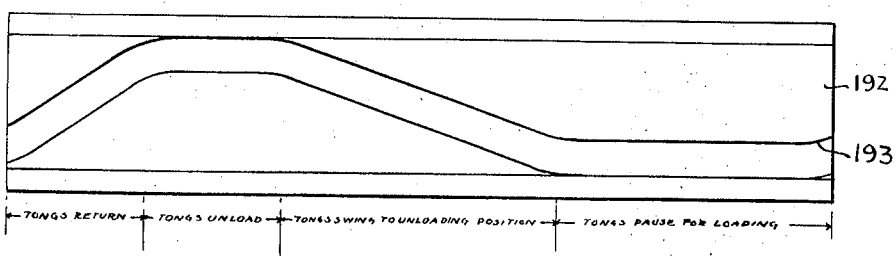

Fig. 1 is a side elevation of the apparatus;
Fig. 2 is a plan view of the apparatus;
Fig. 3 is an elevation of that end of the apparatus which is indicated by the arrows 3—3 in Fig. 1;
Fig. 4 is a transverse cross-sectional view of the apparatus, on the line 4—4 of Fig. 1;
Fig. 5 is a transverse cross-sectional view of the apparatus on the line 5—5 of Fig. 1;
Fig. 5a is a fragmentary cross-sectional view, on the line 5a—5a, of Fig. 5;
Fig. 6 is a fragmentary view, on an enlarged scale, of a portion of Fig. 5;
Fig. 7 is a fragmentary cross-sectional view, on the line 7—7 of Fig. 6;
Fig. 8 is a transverse cross-sectional view of the apparatus, on the line 8—8 of Fig. 1;
Fig. 9 is a transverse cross-sectional view of the apparatus, on the line 9—9 of Fig. 1;
Fig. 10 is a transverse cross-sectional view of the apparatus, on the line 10—10 of Fig. 1;
Fig. 11 is a transverse cross-sectional view of the apparatus, on the line 11—11 of Fig. 1;
Fig. 12 is a longitudinal cross-sectional view of the apparatus, on the line 12—12 of Fig. 2;
Fig. 13 is a cross-sectional view on the line 13—13 of Fig. 12;
Fig. 14 is a view, partly in section and partly in elevation of one of the work spindles;
Fig. 15 is a cross-sectional view of one of the work chucks, taken on the line 15—15 of Fig. 16; and Fig. 16 is a similar view, taken on the line 16—16 of Fig. 15;
Fig. 17 is a view in side elevation of the unloading tong mechanism;
Fig. 18 is a plan view, illustrating, in a more or less diagrammatic manner, the movements of the unloading tong mechanism shown in Fig. 17;
Fig. 19 is an enlarged detail view of the chuck-opening mechanism;
Fig. 20 is a view, partly in elevation and partly in section, taken on the line 20—20 of Fig. 19;
Fig. 21 is an enlarged detail view of the chuck-closing mechanism;
Fig. 22 is a view of the feed chute operating mechanism and associated parts taken on a plane substantially indicated by the line 22—22 of Fig. 10;
Fig. 23 is a face view of the main cam of the apparatus; and
Fig. 24 is a development of the face of the unloading cam.

Although the present apparatus is capable, with suitable modifications, of being employed in connection with forging machines of various types, it has been designed, in this particular case, for use in association with a roll forging mill of a type used for making roll-forged articles, such for example as automobile axles.

A roll forging mill of the type disclosed in this application is shown and described in substantial detail in the patent to F. H. Moyer, No. 1,736,321, granted Nov. 19, 1929, and the description in the present case will accordingly be limited to only the essential features of the mill.

As shown more particularly in Figs. 1, 2, 10, 17 and 18, the roll-forging mill comprises spaced housings 10 and 11 in which are journalled the upper and lower rolls 12 and 13 respectively. Rolls 12 and 13 are respectively provided with removable forging dies 14 and 15, which extend substantially 180 degrees of the circumference of the rolls to which they are secured and are arranged to cooperate to produce a forged article. Each of the dies is provided with a series of circumferential grooves, and the grooves in one die cooperate with the corresponding grooves in the other die to provide a plurality of passes through which a bar blank is adapted to be successively passed to produce the desired finished article. The successive passes are designated in Figs. 2 and 10 by the reference numerals 1 to 6 inclusive. In the use of roll forging mills of the aforesaid character, it has heretofore been the practice for an operator to grip a heated bar blank with a pair of tongs and pass the blank between the rolls when the dies of the latter are out of pass-defining relationship, the position of the blank or partly finished product being determined by suitable stops at the rear of the mill. With the bar blank thus positioned, and the rolls revolving in the direction indicated by the arrows in Fig. 17, the dies grip the bar and roll it outwardly towards the operator, the product being rolled to the shape of the grooves in the dies. The bar is given one or more passes through each set of grooves in the dies, and is also rotated upon its axis between each rolling operation so as to preclude the formation of a fin on the product at any stage in the forging thereof.

It will be noted that the foregoing operations involve the gripping of the bar blank or partly finished product by means of tongs in the hands of an operator. Such operator must necessarily be highly skilled in his duties, as he is required not only to firmly grip and manipulate the tongs during the aforesaid rolling and blank rotating movements, but to properly position the blank or partly finished product for each rolling operation. Inasmuch as it is desirable in most cases to produce the finished or substantially finished article without reheating the bar blank or partly finished product at any stage in the operations, the operator is of necessity obliged to so time his movements as to avoid undue delays. Moreover, the limitation as to the size of the mill and the necessity of permitting the operator to perform his work in an unhampered manner, has heretofore limited the mill capacity to that of a single operator utilizing the rolls for the production of but one article at a time.

As previously stated, the present invention has as its primary objects the elimination of the human or personal element in the manufacture of roll-forged articles, the production of such articles in a more uniform manner than is possible with manual control of the various operations, a considerable increase in the capacity of a mill of given size, and the avoidance of the necessity of reheating the bar blank or partly finished product at any stage in the various operations.

Referring again to the drawings, the rolls in the present mill are driven by a motor 16 through the intermediary of motor shaft pinion 17, gear 18, pinion 19, bullgear 20, mounted on one end of shaft 21, the gear 22 on the opposite end of this shaft, gear 22 driving the roll 15 directly by means of the gear 23 secured to the neck of said roll, and driving the roll 12 through the medium of gear 24 which is meshed with gear 25 on the neck of roll 12. The forging dies 14 and 15 are suitably balanced by means of counterweights secured to the neck of the roll on which the dies are mounted. One of these counterweights, designated by reference numeral 26, is shown in Figs. 1 and 2.

Extending longitudinally in advance of the roll-forging mill are a pair of spaced I-beams 27 and 28, which form the main supporting frame for substantially all of the operating mechanisms to be hereinafter described.

Referring now to Figs. 1, 2, and 5 to 12 inclusive, the main frame has mounted thereon a pair of longitudinally spaced spindle quill guides, each of which consists of a base casting 29, a top casting 30 and end castings 31 and 32 bolted to the base and top castings. The aforesaid castings, when assembled in the manner most clearly shown in Fig. 8, provide a continuous shallow channel or guideway 33 for the enlarged disk-like portions 33a of the spindle quills to be presently described.

Extending between the aforesaid quill guides is a casting 34 having adjacent its sides, and coplanar with the guideways 33 in the quill guides, tracks 35, the substantially semicircular end portions of which are formed by castings 36 which are bolted to the casting 34. These tracks cooperate with the guideways 33 to movably support and guide the spindle quills to be presently described. Secured to the sides of the casting 34, but spaced therefrom as by cylindrical spacers 37, see Fig. 5a, are plates 38. The plates 38 and the sides of the casting 34 form a support for a plurality of pins 39, which in turn support rollers receiving the teeth of the spindle-quill sprockets 41, as shown most clearly in Fig. 6.

The casting 34 and side plates 38 are firmly supported on a pair of spaced longitudinally extending tubular members 42, the ends of which are mounted on front support 43 and rear support 44, which are bolted or otherwise secured to the main frame members 27 and 28.

The spindle quills, of which there are fourteen in number, are mounted for movement in the somewhat elliptical path shown in Figs. 8 and 9. Each quill comprises a hollow tubular member 45 having a centrally disposed sprocket 46, end sprockets 41, and enlarged disk-like portions 33a intermediate the center and end sprockets. Each alternate quill has mounted therein for sliding movement longitudinally thereof a spindle 47, the detailed construction of which is shown in Fig. 14.

The spindle 47 is keyed to the quill in which it is mounted and comprises a solid member 48 having a forward end 49 of reduced diameter and a counterbore 50 in its rear end, within which is received one end of a coupling shaft 51. Shaft 51 is rigidly secured to members 48, as by means of rivets 52. The portion of shaft 51 which extends out of the bore 50 has a longitudinally extending slot or keyway 53, and the shaft has an integral rear portion 54 of reduced diameter, the rear end of which is threaded for the reception of a spring adjusting nut 55. Slidably mounted on the shaft 51 is a tubular member 56, the inner end of which is provided with a key 57 which has a sliding fit in keyway 53 and prevents rotation of member 56 with respect to member 48. The portion 54 of shaft 51 has mounted thereon a collar 58 which forms a seat for one end of a coil spring 59, the other end of which abuts the nut 55. The spring 59 normally forces the collar 58 into engagement with an internal shoulder 60 of the tubular member 56, thereby coupling said member with the member 48. The nut 55 may be adjusted to vary the degree of tension of the spring. Secured to the rear end of member 56 is a screw 61, provided with a head 62, whereby the screw may be adjustably positioned within the end of member 56 to vary the effective length of the spindle. The screw may be locked in adjusted position by means of a lock-nut 63.

Each of the spindles 47 has removably secured to the forward end 49 thereof a chuck, the detailed construction of which is shown most clearly in Figs. 15, 16, 19 and 20. These chucks, as will appear hereinafter, are for the purpose of gripping and holding the heated bar blanks during the various rolling operations. Each chuck comprises a body 64 having a pair of arms 65 in which is mounted a bearing bolt 66. Bolt 66 provides a pivotal mounting for a pair of jaws 67, which are provided at their forward ends with semi-circular inserts 68 of heat and wear-resistant steel. The jaws 67 have rearwardly extending furcations 69, the rear ends of which are provided with screws 70, the heads of which are normally caused to bear against the cam ends 71 of a cam member 72 by means of a coil spring 73 interconnecting the jaws 67 rearwardly of their pivotal mounting. The screws 70 are adjustable to vary the size of the opening formed by the jaw inserts 68. The cam 72 is journalled in bearings 74 which are removably secured to the body of the chuck. Movement of the cam 72 to close the jaws and to permit opening thereof by the spring 73 is effected by means of an operating handle 75 which extends through the cam member 72.

As previously stated, the spindle quills 45 are adapted to be indexed or moved in unison at predetermined intervals along the path in Figs. 6 and 9. For this purpose, an endless roller chain 76 is provided, which chain engages about half of the central sprockets 46 of the quills. This chain is adapted to be driven by a large sprocket 77, which is mounted on a jack shaft 78 journalled in bearing brackets 79, which are bolted to the end castings 31 of the quill guides. Slack in the chain 76 is taken up by means of an idler sprocket 80 mounted on the end casting 31. In order to insure an accurate indexing movement of the quills, the sprockets 41 at each end of the latter are engaged by endless roller chains 81, which, as shown most clearly in Figs. 5 and 6, are maintained in a relatively taut condition by chain take-up devices, which normally engage the lower runs of the chains.

Each of these take-up devices includes a pair of side plates 82 which are bolted to the base casting 29 and spaced apart by means of blocks 83. Journalled in side plates 82 at points intermediate the blocks 83 are shafts 84, each of which has an opening 85 extending diametrically therethrough midway of its ends, for the reception of the stem 86 of a toggle arm having a head 87. The toggle arm is thus slidably mounted on the shaft 84 and is maintained in its normal position, as shown in Figs. 5 and 6, by means of a coil spring 88 mounted on the toggle arm between the head 87 thereof and the shaft 84. The head 87 carries a ball-bearing in which is mounted a pin 89, which forms a support for spaced roller side plates 90. Side plates 90 support rollers 91 which engage the lower runs of chain 81. The toggle arms are oscillatable between stop pins 92, and it will be apparent from the construction of the take-up devices that they are freely movable to accommodate the movement of sprockets 41 without interruption of their chain tautening function.

Intermittent movement of the chain 76, for the purpose of indexing the spindle quills 45 is effected by a Geneva motion mechanism, as follows: The shaft 78 has mounted thereon a sprocket 93 which is driven by an endless roller chain 94, which in turn is driven by a smaller sprocket 95, see Fig. 5. Sprocket 95 is mounted on a jack shaft 96, which is journalled in a bearing bracket 97 secured to the frame member 27. Shaft 96 has keyed thereto at one end a bevel gear 98, which is in mesh with a bevel gear 99 keyed to a jack shaft 100. Shaft 100 is journalled in bracket 97, extends through frame member 27 and has mounted on its opposite end a Geneva wheel 101, provided with four radial slots 102. The Geneva wheel is adapted to be intermittently rotated by a drive wheel 103 which is provided adjacent its periphery with a drive roller 104 adapted to successively enter the radial slots 102 of the Geneva wheel. The drive wheel 103 is rigidly secured to one face of a cam body 105 which is keyed to the main drive shaft 106. Shaft 106 is journalled in brackets 107 and 108 secured to members 27 and 28 respectively. It will be apparent from the aforesaid description that with each revolution of cam body 105, the Geneva wheel will be caused, by roller 104, to rotate one-quarter of a revolution, or 90°. Such rotation of the Geneva wheel will effect a corresponding axial rotation of the spindle quills.

Mechanism is also provided for reciprocating certain of the spindles in alternation with the indexing thereof. Such mechanism is best shown in Figs. 1, 2, 3, 4 and 12, and includes a slide 109 provided with rollers 110 which engage the tubular members 42 and facilitate the movement of the slide along these members. Slide 109 has formed in its forward upper portion an open-ended slot 112 which extends transversely of the machine and is adapted to form a passageway for the heads 62 of the spindles 47. Cap plates 113 and 114, as shown in Figs. 4 and 12, are removably secured to the slide and overlie the slot 112 therein so as to cause a return movement of the spindles, as will presently be described. The slide 109 is provided with a pair of upstanding lugs or ears 115 in each of which is mounted a pin 116 having a roller 116a thereon. These pins and rollers extend into elongated openings 117 in one end of levers 118, which are keyed at their lower ends to a shaft 119. Shaft 119 is supported by brackets 120 which depend from frame members 27 and 28 and are interconnected by a tie rod 121. Keyed to the shaft 119 intermediate the ends thereof is a cam follower arm 122, provided at its opposite end with a roller 123, which extends into a cam slot 124 in cam plate 125, which is bolted or otherwise secured to the cam body 105.

The main drive shaft 106 is driven in unison with the rolls 12 and 13 of the roll-forging mill by means of mechanism which includes a sprocket 126 which is mounted on shaft 21, endless drive chain 127 and sprocket 128a, which is mounted on one end of the shaft 106.

Secured to one side of the slide 109 externally of the rollers 110 on that side is a bracket 128, which extends rearwardly and is provided at its rear end with a tubular portion 129, within which is mounted a spindle engaging member, the function of which will be later described. Such spindle engaging member, as shown in detail in Fig. 13, includes a pin 130, provided at its forward end with a button 131 and at its rear end with an enlarged collar 132 and an extension 133 of smaller diameter than the body of the pin. The pin is slidably mounted in a sleeve 134 which is adjustable axially of the tubular portion 129 of bracket 128. A coil spring 135 mounted within the sleeve 134 between the collar 132 and a screw 136 provides a resilient backing for the pin 130. The screw 136 is adjustable to vary the tension of the spring. A nut 137 is provided to limit the rearward movement of the pin 130 and a lock-nut 138 is provided to lock the nut 137, which is adjustably mounted on the pin, in its adjusted position. Forward movement of the pin is limited by engagement of collar 132 with the sleeve 134.

Secured to the other side of the slide 109, externally of the rollers 110 on that side is a bracket 139, which extends rearwardly and is provided at its rear end with a tubular portion 140, within which is mounted spindle-engaging means similar in all respects to that mounted in the portion 129 of bracket 128. This mechanism has been described in the preceding paragraph.

The aforesaid spindle-engaging means, together with other means to be now described, form devices for automatically opening and closing the chucks at predetermined points in the travel of the spindles.

The chuck-closing devices include, in addition to the spindle-engaging means mounted on bracket 139, means which are best shown in Figs. 2, 11 and 21, and comprising a support 141 mounted on one of the tubular members 42 adjacent the forward end thereof. Secured to the support 141 is a member 142 having an offset upstanding lug 143, beveled at one side to provide an abutment surface 144. The member 142 is adjustable longitudinally of its support.

The chuck-opening device includes, in addition to the spindle-engaging means mounted on bracket 128, means which are best shown in Figs. 1, 11, 19 and 20. Connected to the top castings 30 of the spindle quill guides are a pair of spacer rods 145, to the threaded forward end of one of which is secured a support 146. Mounted on the forward end of support 146 is a latch 147. Latch 147 is swingable to a slight extent circumferentially of its support by virtue of a key and slot connection shown in Fig. 20, and is normally maintained in its lowermost position by means of a spring 148, one end of which is disposed within a socket 149 in the upper edge of the latch and the other end of which is in engagement with a fixed member 150. The reason for mounting the latch 147 in the aforesaid manner will appear in the description of the method of operation to be presently described.

Means are also provided for delivering to the machine bar blanks which are to be roll-forged and for unloading or conveying the finished or roll-forged articles from the machine. Each of these machines is adapted to be driven in synchronism with the roll-forging mill and spindle operating mechanism so that all of the operations incidental to the use of the machine are automatic.

The bar blank delivery apparatus is best shown in Figs. 1, 2, 5, 8, 10 and 22, and comprises a pair of spaced endless chains 151, each of which is provided with a carrier hook 152, these hooks being in alignment with each other. Side guards 153 assist in aligning the bar blanks carried by the chains. The chains 151 are driven by sprockets 154 which are mounted on a shaft 155. Shaft 155 is driven by main drive shaft 106 through the intermediary of sprocket 156, chain 157, sprocket 158, bevel gears 159 and 160, sprocket 161, chain 162 and sprocket 163. The shaft 155 is supported by brackets 164 and 165, most clearly shown in Fig. 22. These brackets are secured to the rear end of an inclined chute 166, which is rigidly mounted on the mill housing 11, as by means of an angle 166a. The chute 166 is provided with side guides 167. Shaft 155 also forms a pivotal support for a pair of laterally spaced arms 170 and 171, and these arms form a support for a V-block 169, one arm 168 of which normally abuts the lower end of chute 166.

The block 169 is adapted to receive and support the bar blank, designated B, while it is being grasped by one of the chucks, and in order to permit the blank to be thereafter freely moved to its next position, the block is adapted to be periodically lowered from its normal position, which is shown in Fig. 10. For this purpose, a bar 172 is provided, which extends between and is secured to arms 170 and 171. This bar is engaged by an eye-bolt 173, the stem of which, as shown in Fig. 22, is secured to a bracket 174 of bell-crank lever shape. Bracket 174 is mounted on a shaft 175, which is journalled in pedestal bearings 43a and 43b, and by virtue of the elongated slot 176 in said bracket, the bracket may be reciprocated vertically. The lever is maintained in its normal position by means of a cam 177 which engages a roller 178 secured to the lever, but the weight of the block 169 and arms 170 and 171 is sufficient to cause these parts to be depressed when the roller enters the recess 179 in the cam, during the rotation of the cam. The cam is keyed to shaft 175 and the shaft is rotated through the intermediary of a sprocket 180, which is keyed to the same shaft as sprocket 158, chain 181 and sprocket 182, which is keyed to the end of shaft 175.

The roll-forged or finished articles are conveyed from the machine by means which are best shown in Figs. 1, 2, 10, 17, 18 and 24. Such means includes a shaft 183, which is mounted in a bracket 185 and serves to support spaced pairs of tong jaws 186 and 187. Jaws 187 are fixed with respect to the shaft 183, but the jaws 186 are pivotally mounted on this shaft and are provided with beveled surfaces 188 to facilitate reception of the roll-forged article, being tilted upwardly when the finished article is entered between the jaws. Bracket 185 is adjustably secured to a shaft 189, which is supported by an arm 190, mounted for oscillatable movement about a pin 191. Oscillation of the arm 190 is effected by means of a cam 192 which is keyed to the end of shaft 175 and is provided with a cam groove 193 into which cam roller 194 on arm 190 extends. The development of the peripheral surface of this cam is clearly shown in Fig. 24. Coincidently with each oscillation of arm 190, the tong jaws are rotated 180°. For this purpose, the shaft 189 is provided intermediate its ends with a bevel gear pinion 195 which is in mesh with a bevel gear segment 196, which is mounted on the roll housing 10.

Operation of machine

Having now described in detail the construction of the machine, the function thereof will be best understood by a description of the various movements and operations which each bar blank undergoes from the time that it is delivered to the machine until the time it is unloaded or conveyed from the machine.

The bar blank B, as indicated in Fig. 10, after being heated to a forging temperature in a suitable furnace (not shown) is deposited on the chains 151 and is carried by the hooks 152 thereof to the upper end of the chute 166. The bar is deposited on the chute and rolls by gravity into the V-block 169, in which position it is ready to be grasped by one of the spindle chucks, it being understood that one end of the bar blank projects beyond the arm 170. In the meantime, one of the spindles 47 has moved into axial alignment with the bar blank, such spindle being designated S in Figs. 3 and 21. At this point the slide 109 is moved forwardly, but inasmuch as the spindle S has not yet entered the slot 112 in the slide, it will not be moved forwardly by the slide. Consequently, the spindle remains stationary and in the position shown in Fig. 21, with the chuck jaws 67 thereof open. As the slide advances, a movement which is effected by rotation of the cam 125 through an arc of 130° (see Fig. 23), the button 131 of the spindle-engaging member housed within tubular portion 140 of bracket 139 engages the head 62 of spindle S. The impact of the button against the head is cushioned by spring 135, but after the nut 137 engages the end of sleeve 134, the spindle is moved forward so as to cause the chuck jaws 67 to embrace the end of the bar blank B which is resting on the block 169. During this movement, the handle 75 of the chuck is moved by the lug 143 of the chuck-closing device to the dotted line position indicated in Fig. 21, thereby causing the jaws to firmly grip the bar blank.

The slide 109 remains at rest during a 10° movement of cam 125 (see Fig. 23), and thereafter the slide returns to its retracted or initial position, shown in Fig. 12. In the final stage of the return movement of the slide, the spindle S is returned to its initial position as a result of the engagement of the caps 113 and 114 with the head 62 of the spindle. The indexing of the spindle S is initiated just before the slide is in its fully retracted position. The slide remains in its returned position during a 30° movement of the cam 125. The indexing proceeds during a 60° rotation of cam 125 but is not completed until the slide has begun to advance, as will be apparent from Fig. 23. It will be understood that this, as well as the succeeding indexing movements, that is, the movement of the spindle from station to station, is accompanied by a rotation of the spindle through an arc of 90°. Immediately prior to the indexing of spindle S, the block 169 is momentarily lowered by means of mechanism hereinbefore described, so as to permit the bar blank B, as a result of the indexing, to move to the position indicated in dotted lines in Fig. 10. The spindle S remains at rest until the slide has completed its advance movement and again returned to its initial position.

Following this movement of the slide, the spindle S is again indexed, as a result of which the bar blank B is brought into alignment with pass 1 of the forging dies 14 and 15. At the conclusion of this indexing movement, the head 62 of spindle S has moved into the slot 112 of the slide. The slide is then advanced and carries with it the spindle S, the bar blank B being thereby advanced to its extreme forward position. As the slide is retracted the dies 14 and 15 reach the position shown in Fig. 17 and grip the blank, rolling the blank to the shape of the grooves comprising pass 1. The speed of the slide during its return movement is equal to the peripheral speed of the dies, but should the speed of the slide slightly exceed the speed of the dies, no harm will result to the spindle or bar blank, for in this event the spring 59, within the spindle, will permit a separation of members 48 and 56 of the spindle. The spring 59 is, however, of such strength as to permit separation of these members only in the event that the drag on the bar blank by the dies becomes excessive.

The indexing, feeding and withdrawal of the bar blank for the succeeding passes is identical with the movements just described with reference to pass 1, so that further description of these movements is believed to be unnecessary. It should be mentioned, however, that when the bar blank B is entering pass 3, another bar blank has been delivered to the block 169 and is ready to be grasped by the spindle aligned therewith.

During the return of the rolled article from pass 6 of the dies, the tong jaws 186 and 187 have been swung to the extreme right or unloading position, as shown in dotted lines in Fig. 18, and are ready to receive the article. When fully retracted, the article occupies the position shown by the dotted lines C in Fig. 18. The article is then indexed to the position indicated by the dotted lines D, and during this indexing movement, the article enters the tong jaws 186 and 187. In the position D of the article, the head 62 of the spindle S has moved out of the slot 112 of the slide. Consequently, on the next advance movement of the slide, the spindle remains stationary until the button 131 of the spindle-engaging member housed within tubular portion 129 of bracket 128 engages the head 62 of the spindle. The impact of the button against the head is cushioned by spring 135, but after the nut engages the end of sleeve 134, the spindle is moved forward so as to cause the handle 75 of the chuck to engage the latch 147 of the chuck-opening device. This causes the jaws 67 to open. During this opening movement of the chuck, the roll forged article is moved from position D to the position A in Fig. 18, the article sliding in the tong jaws 186 and 187 during such movement.

As the slide 109 returns to its extreme rear position, the spindle S is retracted by the slide so as to be entirely clear of such article, which is left gripped between the tong jaws. With the roll-forged article thus gripped, it is carried by the jaws 186 and 187 to the extreme left position shown in Fig. 18, in which position, it is ready to be removed in any desired manner for further treatment.

It will be apparent from Fig. 11, that the spindle chucks, during the axial rotation thereof which accompanies the indexing movements, strike the latch 147 of the chuck-operating device. By pivotally mounting the latch, the chuck is permitted to be freely rotated during indexing.

It will be obvious that the use of apparatus such as has been described will eliminate the human or personal element in the manufacture of various types of roll-forged articles and will insure a uniformity in the articles which can be matched only by skilled labor of the highest type. It will also be apparent that the use of the apparatus in conjunction with a roll-forging mill of the character described will greatly increase the productive capacity of the mill and will increase the speed of forging of each article to such an extent as to render reheating of the bar blank at any stage in the operations unnecessary.

Other modes of applying the principle of my invention may be employed instead of the one explained, change being made as regards the product and means herein disclosed, provided the step or steps stated by any of the following claims or the equivalent of such stated steps be employed.

I therefore particularly point out and distinctly claim as my invention:

1. In an apparatus of the character described, a spindle provided with a blank holding chuck arranged to be successively positioned at a plurality of stations spaced transversely of said apparatus, automatically and independently of any act on the part of an operator, and means for positively reciprocating said spindle at each of said stations.

2. In an apparatus of the character described, a spindle provided with a blank holding chuck arranged to be successively positioned at a plurality of stations spaced transversely of said apparatus, automatically and independently of any act on the part of an operator, and means for positively moving said spindle forwardly of said apparatus at each of said stations.

3. In an apparatus of the character described, a spindle provided with a blank holding chuck arranged to be successively positioned at a plurality of stations spaced transversely of said apparatus, automatically and independently of any act on the part of an operator, and means for positively moving said spindle forwardly of said apparatus at each of said stations, said means comprising a slide for directly moving the spindle, and means for actuating said slide.

4. In an apparatus of the character described, a spindle provided with a blank holding chuck arranged to be successively positioned at a plurality of stations spaced transversely of said apparatus, automatically and independently of any act on the part of an operator, and means for positively moving said spindle forwardly of said apparatus at each of said stations and rearwardly of said apparatus to a position for movement to the next station.

5. In an apparatus of the character described, a spindle provided with a blank holding chuck arranged to be successively positioned at a plurality of stations spaced transversely of said apparatus, automatically and independently of any act on the part of an operator, and means for positively moving said spindle forwardly of said apparatus at each of said stations and rearwardly of said apparatus to a position for movement to the next station, said means comprising a slide directly connected to said spindle, and means for reciprocating said slide.

6. In combination with a mill for roll-forging bar blanks, said mill including a pair of cooperating dies providing a plurality of passes, a spindle provided with a blank-holding chuck arranged to be successively aligned with each of said passes automatically and independently of any act on the part of an operator, and means for positively reciprocating said spindle with respect to said dies.

7. In combination with a mill for roll-forging bar blanks, said mill including a pair of cooperacting dies providing a plurality of passes, a spindle provided with a blank-holding chuck arranged to be successively aligned with each of said passes automatically and independently of any act on the part of an operator, and means for positively moving said spindle towards the dies whereby a blank held by said chuck is entered between the dies for forging thereby.

8. In combination with a mill for roll-forging bar blanks, said mill including a pair of cooperating dies providing a plurality of passes, a spindle provided with a blank-holding chuck arranged to be successively aligned with each of said passes automatically and independently of any act on the part of an operator, means for positively moving said spindle towards the dies whereby a blank held by said chuck is entered between the dies for forging thereby, said means comprising a slide for directly moving the spindle, and means for actuating said slide.

9. In combination with a mill for roll-forging bar blanks, said mill including a pair of cooperating dies providing a plurality of passes, a spindle provided with a blank-holding chuck arranged to be successively aligned with each of said passes automatically and independently of any act on the part of an operator, means for positively moving said spindle towards the dies whereby a blank held by said chuck is entered between said dies for forging thereby, and away from said dies to a position for movement to the next pass.

10. In combination with a mill for roll-forging bar blanks, said mill including a pair of cooperating dies providing a plurality of passes, a spindle provided with a blank-holding chuck arranged to be successively aligned with each of said passes automatically and independently of any act on the part of an operator, means for positively moving said spindle towards the dies whereby a blank held by said chuck is entered between said dies for forging thereby, and away from said dies to a position for movement to the next pass, said means comprising a slide directly connected to said spindle, and means for reciprocating said slide.

11. In combination with a mill for roll-forging bar blanks, said mill including a pair of cooperating dies providing a plurality of passes, a spindle provided with a blank-holding chuck arranged to be successively aligned with each of said passes, and a slide guided for reciprocal movement towards and away from said mill, said slide having a passageway extending transversely of the spindle to receive the rear end of the spindle whereby to reciprocate the spindle.

12. In combination with a mill for roll-forging bar blanks, said mill including a pair of cooperating dies providing a plurality of passes, a plurality of spindles disposed in advance of said mill and movable into successive alignment with said passes, a slide having a passageway extending transversely of the spindle adapted to receive the rear ends of said spindles, and means for reciprocating said slide.

13. In combination with a mill for roll-forging bar blanks, said mill including a pair of dies providing a plurality of equally spaced parallel passes, a guide disposed in advance of said mill and providing an endless path, the upper part of which is in alignment with the plane of said passes, quills arranged for movement in said path and spindles extending through alternate quills, said spindles provided with chucks for holding said blanks.

14. In combination with a mill for roll-forging bar blanks, said mill including a pair of dies providing a plurality of spaced parallel passes, a guide disposed in advance of said mill, quills movably mounted in said guide, spindles keyed to alternate quills, but movable longitudinally thereof, and chucks secured to the forward end of said spindles.

15. As an element of a roll-forging apparatus, a chuck-supporting spindle comprising axially aligned portions which are normally in endwise abutment with each other, but separable from each other along their axes, and spring means for resisting such separation of said portions.

16. As an element of a roll-forging apparatus, a chuck-supporting spindle comprising axially aligned portions which are normally in endwise abutment with each other, but separable from each other along their axes, means for preventing relative rotation of said portions, and spring means for resisting such separation of said portions.

17. In an apparatus of the character described, means for removing a forged article from the apparatus, comprising an arm mounted for oscillation in a vertical plane, an article retaining device mounted on said arm and means for rotating said device simultaneously with the oscillation of said arm.

18. In combination with a mill for roll-forging bar blanks, said mill including a pair of rolls providing a plurality of spaced passes, a spindle provided with a blank holding chuck arranged to be successively aligned with each of said passes automatically and independently of any act on the part of an operator, and non-yieldable means for moving said spindle towards the rolls whereby a blank held by said chuck is entered between the rolls for forging thereby.

19. In combination with a mill for roll-forging bar blanks, said mill including a pair of rolls providing a plurality of spaced passes, a spindle provided with a blank-holding chuck arranged to be successively aligned with each of said passes automatically and independently of any act on the part of an operator, and means for moving said spindle towards the rolls whereby a blank held by said chuck is entered between the rolls for forging thereby, said means being operative to move said spindle away from the rolls during the forging operation.

20. In combination with a mill for roll-forging bar blanks, said mill including a pair of rolls providing a plurality of spaced passes, a spindle provided with a blank holding chuck, said spindle being movable towards said rolls to enter a blank held by said chuck between the rolls for forging thereby, said rolls forcing said blank in the opposite direction during the forging operation, and means independent of said rolls for moving said spindle in said opposite direction as the blank is forged.

21. In combination with a mill for roll-forging bar blanks, said mill including a pair of rolls providing a plurality of spaced passes, a spindle provided with a blank holding chuck, said spindle being movable towards said rolls to enter a blank held by said chuck between the rolls for forging thereby, said rolls forcing said blank in the opposite direction during the forging operation, and power driven means independent of said rolls for moving said spindle in said opposite direction during forging of the blank and thereafter.

FLOYD L. SCOUTTEN.